(12) United States Patent
Brown

(10) Patent No.: US 7,865,152 B2
(45) Date of Patent: Jan. 4, 2011

(54) RF WAVEFORM MODULATION APPARATUS AND METHOD

(75) Inventor: Kenneth Brown, Yucaipa, CA (US)

(73) Assignee: Raytheon Company, Waltham, MA (US)

( * ) Notice: Subject to any disclaimer, the term of this patent is extended or adjusted under 35 U.S.C. 154(b) by 619 days.

(21) Appl. No.: 11/875,131

(22) Filed: Oct. 19, 2007

(65) Prior Publication Data

US 2010/0039340 A1 Feb. 18, 2010

(51) Int. Cl.
*H04B 1/04* (2006.01)
*H04B 7/10* (2006.01)
*H01Q 21/06* (2006.01)
*H01Q 11/02* (2006.01)

(52) U.S. Cl. .................... 455/91; 455/110; 455/129; 375/302; 342/365; 343/732

(58) Field of Classification Search .................. 455/1, 455/67.11, 129, 575.7, 110–111; 343/702, 343/732, 850; 342/361, 365; 375/302
See application file for complete search history.

(56) References Cited

U.S. PATENT DOCUMENTS

| 4,408,206 | A | * | 10/1983 | Fitch et al. | 342/352 |
|---|---|---|---|---|---|
| 5,270,719 | A | * | 12/1993 | Roth | 342/157 |
| 5,982,326 | A | * | 11/1999 | Chow et al. | 342/365 |
| 6,262,690 | B1 | * | 7/2001 | Malone et al. | 343/850 |
| 7,265,558 | B1 | * | 9/2007 | Penndal et al. | 324/637 |
| 7,551,140 | B2 | * | 6/2009 | Knadle et al. | 343/700 MS |
| 2007/0096919 | A1 | * | 5/2007 | Knadle et al. | 340/572.8 |
| 2008/0018525 | A1 | * | 1/2008 | Svy et al. | 342/169 |
| 2009/0028074 | A1 | * | 1/2009 | Knox | 370/278 |

* cited by examiner

*Primary Examiner*—Simon D Nguyen
(74) *Attorney, Agent, or Firm*—SoCal IP Law Group LLP; Steven C. Sereboff; John E. Gunther

(57) ABSTRACT

The disclosed system, device and method for a signal modulation apparatus generally includes a first signal generator suitably configured to generate a first continuous wave radio frequency (RF) signal, and a second signal generator suitably configured to generate a second continuous wave RF signal. A dual-circular polarized antenna may be adapted to receive the first continuous wave RF signal into a right-hand port and the second continuous wave RF signal into a left-hand port, where the signals are combined into a modulated RF signal in the dual-circular polarized antenna.

20 Claims, 3 Drawing Sheets

RF WAVEFORM MODULATION APPARATUS AND METHOD

GOVERNMENT RIGHTS

This invention was made with government support under a contract awarded by Air Force Research Laboratory (AFRL). The government has certain rights in this invention.

FIELD OF THE INVENTION

The present invention generally concerns a electromagnetic modulation apparatus and method; and more particularly, representative and exemplary embodiments of the present invention generally relate to combining at least two continuous wave signals to create a modulated signal.

BACKGROUND OF INVENTION

Directed energy weapons and electronic warfare transmitters generally require the radiation of a high average power amplitude modulated signal. This type of signal may be used to disrupt the electronics of a target device, such as a guided missile, and the like. High average power, the ability to rapidly change the modulation frequency and a signal that has circular polarization are important to disrupt such electronics.

Conventional signal modulation devices create a modulated signal prior to transmission and/or irradiation of a target. The main drawback of these devices is that the average power of a modulated signal is significantly less than a continuous wave signal (with no modulation) because the modulated signal is generated prior to its amplification. This reduction in average power generally limits the range, efficiency and effectiveness of a directed energy weapon.

SUMMARY OF THE INVENTION

In various representative aspects, the present invention provides a signal modulation apparatus and method. Exemplary features generally include a first and second signal generator suitably configured to generate continuous wave radio frequency signals. A dual-circular polarized antenna receives both signals and is suitably configured to induce combination of the signals to create a modulated radio frequency signal.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any signal modulation apparatus. For example, certain representative implementations may include phased array directed-energy units used in applications such as anti-missile defense of an aircraft, fixed target, waterborne vessel, and/or the like.

A detailed description of an exemplary application, namely an anti-missile system, is provided as a specific enabling disclosure that may be generalized to any application of the disclosed system, device and method for providing signal modulation in accordance with various embodiments of the present invention.

Various representative and exemplary embodiments of the present invention generally provide a system and method for generating a modulated radio frequency signal. It will be appreciated that additional features may be readily adapted, extended, or otherwise applied to other electromagnetic signal modulation designs. Accordingly, it will be further understood that the present invention is more generally directed to the generic conceptual approach of implementing a signal modulation apparatus rather than merely disclosing specific module designs and/or combinatorial permutations.

Figure 1:
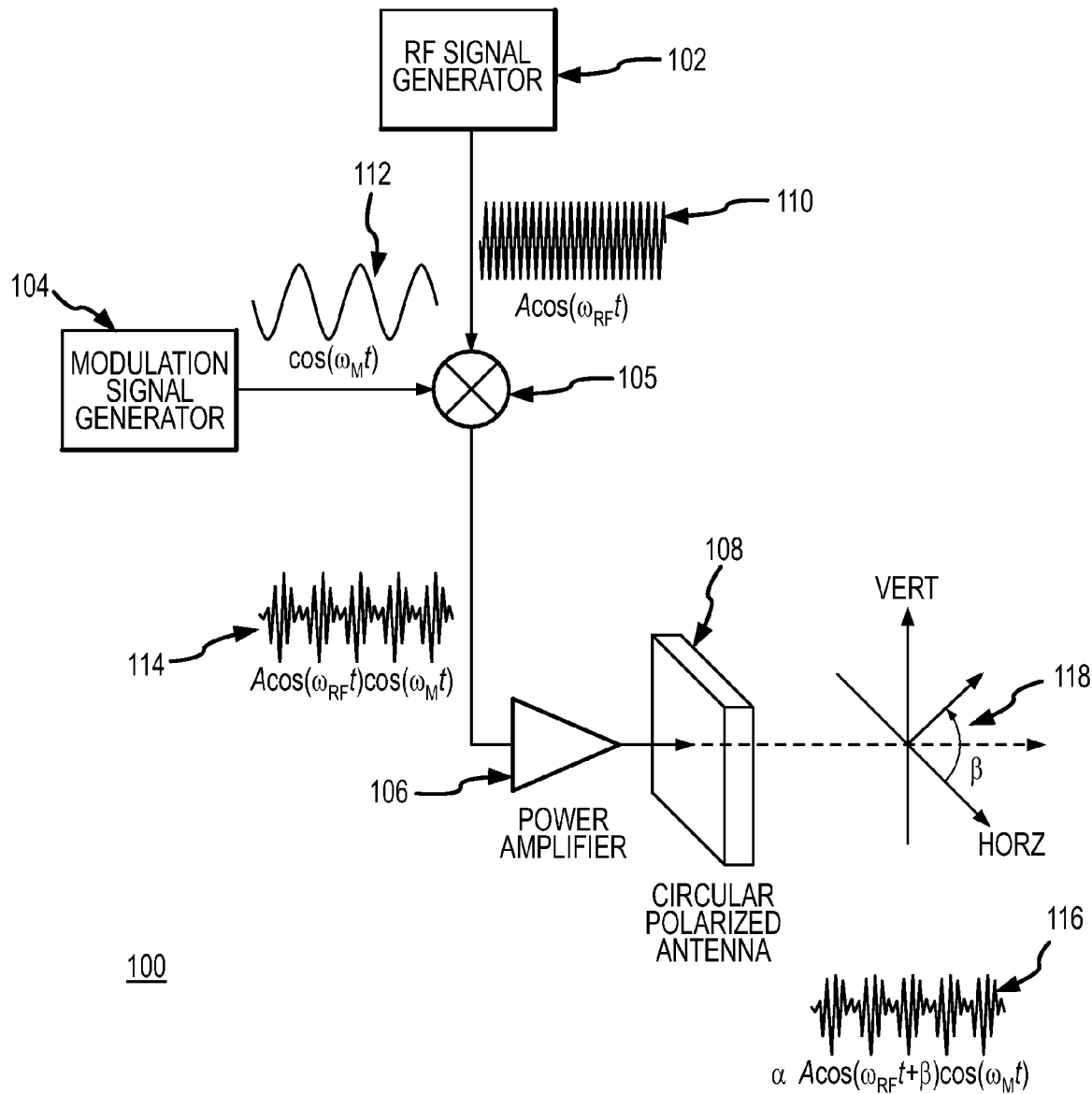
FIG. 1 representatively illustrates a conventional signal modulation apparatus.

FIG. 1 representatively illustrates a conventional signal modulation apparatus 100. The conventional signal modulation apparatus 100 depicted is configured to generate a modulated radio frequency (RF) signal and includes an RF signal generator 102, modulation signal generator 104, mixer 105, power amplifier 106 and a circular polarized antenna 108.

Modulation may include varying one or more characteristics of one RF signal with one or more characteristics of another RF signal. Examples of modulation may include amplitude modulation, frequency modulation, phase modulation, or any combination thereof. Amplitude modulation, as shown in FIG. 1, occurs when two continuous wave signals of different frequency are multiplied together. When multiplied, the peak and trough positions of the two signals do not coincide and wave interference occurs. This produces a resultant, modulated signal with differing amplitude, frequency, and envelope as compared to the original signals.

In operation, RF signal generator 102 creates a continuous wave RF signal 110 that has a voltage proportional to $A\cos(\omega_{rf}t)$ as a function of time t, where A is the amplitude and $\omega_{rf}$ is the radian frequency of the RF signal 110. Modulation signal generator 104 creates a continuous wave modulation signal 112 with a voltage proportional to $\cos(\omega_m t)$ as a function of time t, wherein $\omega_m$ is the radian frequency of modulation signal 112. RF signal 110 may then be combined with modulation signal 112 (modulated) using mixer 105. The resultant modulated RF signal 114 has a voltage proportional to $A\cos(\omega_{rf}t)\cos(\omega_m t)$.

Modulated RF signal 114 may then be fed into power amplifier 106, and subsequently into circular polarized antenna 108. Typically, power amplifiers (tube or solid state) are limited in peak power. For example, if power amplifier 106 is limited to 100 Watts for a continuous wave signal, its peak power will also generally be limited to 100 Watts. Therefore, if modulated RF signal 114 is fed into power amplifier 106, the peak power of modulated RF signal 114 output from power amplifier will be limited to 100 Watts. This limits the average power of a radiated modulated RF signal 116 from circular polarized antenna 108. In other words, realizing modulated RF signal 114 prior to amplification effectively reduces the radiated average power of a radiated modulated RF signal 116 by the modulation percentage or duty cycle (i.e., ratio of the average power to the peak pulse power).

The polarization of an RF signal is defined as the orientation of the electric field vector, which is a vector perpendicular to both the direction of travel and the magnetic field vector. The polarization may be described by the geometric figure traced by the electric field vector upon a stationary plane perpendicular to the direction of propagation, as the wave travels through that plane. An antenna is a transducer that converts radio frequency electric current to electromagnetic waves that are then radiated into space. The electric field determines the polarization or orientation of the radio wave. In general, most antennas radiate either linear or circular polarization.

The energy radiated by any antenna is contained in a transverse electromagnetic wave that is comprised of an electric and a magnetic field. These fields are orthogonal to one another and orthogonal to the direction of propagation. The electric field of the electromagnetic wave is used to describe its polarization and hence, the polarization of the antenna. A circularly polarized electromagnetic wave is comprised of two linearly polarized electric field components that are orthogonal, have equal amplitude and are 90 degrees out of phase. In this specialized case, the polarization ellipse traced in the stationary plane perpendicular to the direction of propagation by the electromagnetic wave is a circle. Depending upon the direction of rotation of the circularly polarized wave, the wave will be LH circularly polarized or RH circularly polarized. The phase relationship between the two orthogonal components, +90 degrees or −90 degrees, determines the direction of rotation. Circular polarized antenna 108 may transmit and/or receive electromagnetic energy that is either LH or RH circularly polarized. Circular polarized antenna 108 radiates one-half its power into horizontal polarization and one-half of its power into vertical polarization. Vertical polarization is phased shifted +/−90 degrees relative to the horizontal polarization (a +90 degree phase shift produces left hand (LH) circular polarization, and a −90 degree phase shift produces right hand (RH) circular polarization).

The conventional signal modulation apparatus 100 produces a horizontal radiated modulated RF signal 116 proportional to $A\cos(\omega_{rf}t)\cos(\omega_m t)$ and a vertical radiated modulated RF signal 116 proportional to $\pm A\sin(\omega_{rf}t)\cos(\omega_m t)$ for LH or RH circular polarized antennas. At an arbitrary polarization angle (β) 118, radiated modulated RF signal 116 is a combination of the two horizontal and vertical polarizations and is proportional to:

$$A\cos(\omega_m t)[\cos(\omega_{rf}t)\cos(\beta)\pm\sin(\omega_{rf}t)\sin(\beta)]$$

which simplifies to:

$$A\cos(\omega_m t)\cos(\omega_{rf}t\pm\beta).$$

As can be seen, radiated modulated RF signal 116 has the same amplitude (A) at any polarization angle (β) 118. This illustrates the advantage of circular polarization for coupling into an arbitrary target electronics orientation of a target in a directed-energy use of radiated modulated RF signal 116. The only effect of polarization angle (β) 118 on radiated modulated RF signal 116 is a change in phase (equal to β) of the radiated modulated RF signal 116. This is inconsequential to a directed energy use of the conventional signal modulation apparatus 100.

As noted above, the conventional signal modulation apparatus 100 has the disadvantage of limiting the average power of the radiated modulated RF signal 116 because modulation occurs prior to amplification and prior to radiation of the radiated modulated RF signal 116.

Figure 2:
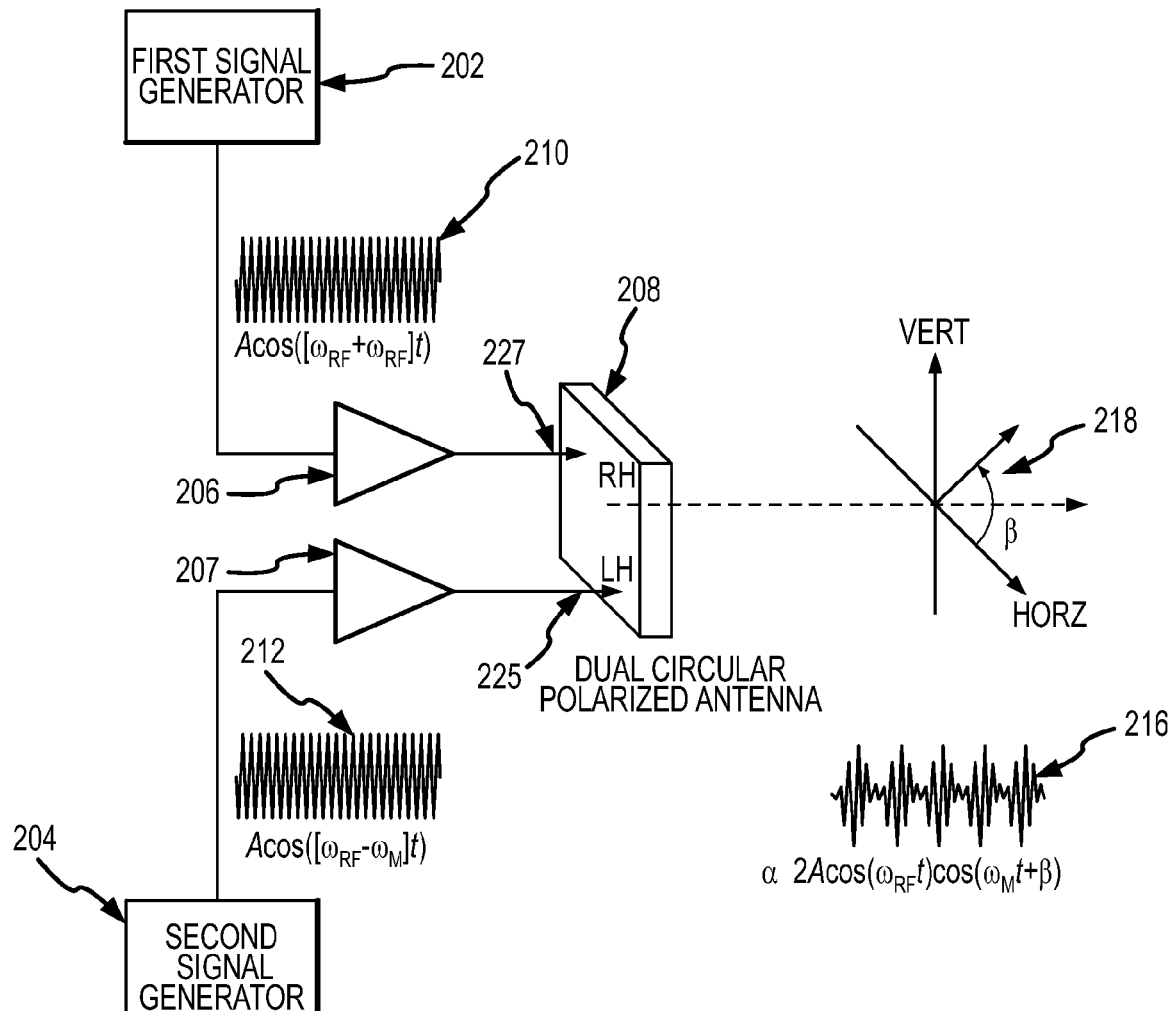
FIG. 2 representatively illustrates a signal modulation apparatus in accordance with an exemplary embodiment of the present invention.

FIG. 2 representatively illustrates a signal modulation apparatus 200 in accordance with an exemplary embodiment of the present invention. In a representative embodiment, signal modulation apparatus 200 produces a similar radiated modulated RF signal as produced in the conventional art, but without the loss of average power induced by modulation.

Signal modulation apparatus 200 may comprise a first signal generator 202, a second signal generator 204, at least one power amplifier 206, 207 and a dual-circular polarized antenna 208. In a representative embodiment, dual-circular polarized antenna 208 transmits and/or receives electromagnetic energy that is both LH and RH circularly polarized. Inputs into left-hand port 225 have vertical polarization phased shifted +90 degrees relative to the horizontal polarization and signals input into right-hand port 227 have vertical polarization shifted −90 degrees relative to the horizontal polarization. So, in effect, dual-circular polarized antenna 208 produces both LH and RH circularly polarized signals.

First signal generator 202 is suitably configured to generate first continuous wave RF signal 210, while second signal generator 204 is suitably configured to generate second continuous wave RF signal 212. In a representative embodiment, one or both of these may be sinusoidal continuous wave RF signals. In an exemplary aspect, first continuous wave RF signal 210 has a voltage proportional to $A\cos([\omega_{rf}+\omega_m]t)$, and second continuous wave RF signal 212 has a voltage proportional to $A\cos([\omega_{rf}-\omega_m]t)$. In this embodiment, first continuous wave RF signal 210 and second continuous wave RF signal 212 are separated in radian RF frequency by $2\omega_m$.

At least one of the first continuous wave RF signal 210 and second continuous wave RF signal 212 may be amplified by one or more power amplifiers 206, 207 prior to being fed into dual-circular polarized antenna 208. In this manner, the full rated average power consistent with first signal generator 202 and second signal generator 204 may be produced in each of the one or more power amplifiers 206, 207.

The output of each of the one or more power amplifiers 206, 207 may be fed into the dual-circular polarized antenna 208. In a representative embodiment, first continuous wave RF signal 210 is input into a right hand (RH) port 227 and second continuous wave RF signal 212 is input into a left hand (LH) port 225 of dual-circular polarized antenna 208. These inputs may be reversed and remain within the scope of the present invention. Unlike the prior art, modulation (combining of the signals) generally occurs after amplification and after input into an antenna. Also, unlike the prior art, a dual-circular polarized antenna 208 is used instead of a circular polarized antenna 108.

Dual-circular polarized antenna 208 is suitably adapted to induce modulation, which may take place substantially in the dual-circular polarized antenna 208 or substantially subsequent to emission of the first continuous wave RF signal 210 and second continuous wave RF signal 212 from dual-circular polarized antenna 208. For example, modulation may occur in free space and/or when first continuous wave RF signal 210 and second continuous wave RF signal 212 reach a target. Because modulation is performed after inputting into dual-circular polarized antenna 208, no power reduction from modulation (as in the conventional art) is observed.

The voltage of a signal radiated based on first continuous wave RF signal 210 input to RH port 227 is proportional to $A\{\cos([\omega_{rf}+\omega_m]t)\cos(\beta)-\sin([\omega_{rf}+\omega_m]t)\sin(\beta)\}$ at an arbitrary polarization angle ($\beta$) 218. Similarly, the voltage of a signal radiated based on second continuous wave RF signal 212 input to LH port 225 is proportional to $A\{\cos([\omega_{rf}-\omega_m]t)\cos(\beta)+\sin([\omega_{rf}-\omega_m]t)\sin(\beta)\}$ at the same polarization angle ($\beta$) 218.

When these two signals are summed together, they are equal to $2A\cos(\omega_{rf}t)\cos(\omega_m+\beta)$. In other words, modulated RF signal 216 radiated by dual-circular polarized antenna 208 is proportional to $2A\cos(\omega_{rf}t)\cos(\omega_m+\beta)$. This is analogous to the radiated modulated RF signal 116 of the prior art ($A\cos(\omega_m t)\cos(\omega_{rf}t\pm\beta)$), but has twice the amplitude (A) at any polarization angle 218. As in the prior art, the only effect of polarization angle ($\beta$) 218 on modulated RF signal 216 is a change in phase (equal to $\beta$).

As noted, the amplitude of modulated RF signal 216 is twice that produced by the conventional art. Since power density of the electromagnetic field emitted by signal modulation apparatus 200 is proportional to the square of the amplitude, there is a four fold increase in radiated power density over the conventional art. However, since signal modulation apparatus 200 requires twice the power (two power amplifiers 206, 207), there is actually a factor of two increase in power density for a given power input. Because the field density decreases with the inverse square of the range, there an approximately 40% increase in either efficiency or range of the modulated RF signal 216 over the conventional art. Further, signal modulation apparatus 200 also takes advantage of circular polarization by coupling into an arbitrary target electronics orientation. At any given reception orientation of a target, the modulated RF signal 216 appears identical to the conventional art modulated RF signal 116, except for a phase difference, which is inconsequential to a directed energy use of signal modulation apparatus 200.

In a further embodiment, dual-circular polarized antenna 208 may receive, for example and without limitation, a modulated RF signal 216. Signal modulation apparatus 200 may then devolve the RF signal into its continuous wave components, for example, into two sinusoidal continuous wave components.

Figure 3:
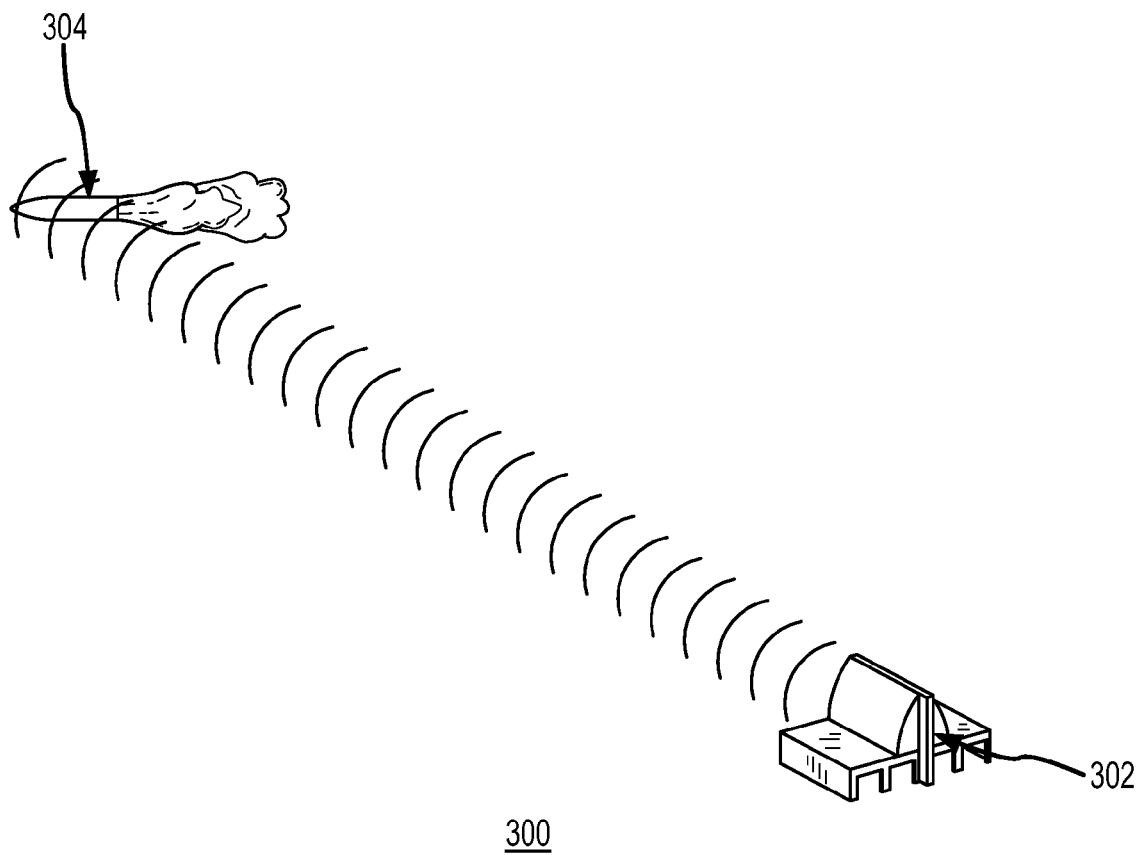
FIG. 3 representatively illustrates an anti-missile system in accordance with an exemplary embodiment of the present invention.

FIG. 3 representatively illustrates an anti-missile system 300 in accordance with an exemplary embodiment of the present invention. Anti-missile system 300 may include a directed energy unit 302, for example and without limitation, comprising a phased array directed energy unit. Directed energy unit 302 may use signal modulation apparatus 200 to generate directed energy at a target 304. Anti-missile system 300 may be deployed to engage one or more targets 304, for example a guided missile such as a Man Portable Air Defense (MANPAD) missile, and/or the like. An example of a target 304 is a shoulder-launched MANPAD missile, which is an infrared (IR) direct threat weapon that may require line-of-sight (LOS) to be established prior to launch. A target 304 may include other features or any combination of the above features and be within the scope of the invention. For example, target 304 may have a tracking system other than IR, or may not need LOS to be launched.

In a representative embodiment, directed energy unit 302 of anti-missile system 300 may provide protection from one or more targets 304 in a defined space, for example a hemispherical space over a given area. Directed energy unit 302 may conjunctively, alternatively or sequentially provide protection to any number of aircraft, watercraft, land vehicles, buildings, and/or the like. A guided missile or other target 304 may be engaged by directed energy unit 302 of anti-missile system 300 to divert the guided missile from its intended path. In a representative embodiment, anti-missile system 300 may be deployed at an airport such that aircraft are protected during takeoff and landing, when they are most vulnerable to a guided missile attack, and/or the like.

Anti-missile system 300 may detect the launch of a guided missile, track the guided missile flight, and may then direct one or more directed-energy units 302 to radiate the guided missile with electromagnetic (EM) radiation produced by signal modulation apparatus 200 such that the guided missile discontinues tracking. Directed-energy unit 302 is suitably adapted to generate and/or receive targeting data and radiate target 304 with EM radiation, for example and without limitation microwave radiation. In a representative embodiment, EM radiation may have the characteristics of modulated RF signal 216 described above. In an exemplary aspect, directed-energy unit 302 may include one or more phased array antennas coupled to radiate a narrow beam of modulated energy, for example microwave energy, into free space. Directed-energy unit 302 may be solid state or use tubes, klystrons, injection-lock magnetrons, and/or the like.

Directed energy unit 302 may be a phased array directed-energy unit suitably configured to direct energy in a particular direction by a means other than a projectile (e.g., transfers energy to a target for a desired effect). A phased array may be a group of antennas in which the relative phases of the respective signals feeding the antennas are varied in such a way that the effective radiation pattern of the array is reinforced in a desired direction and suppressed in undesired directions. The relative amplitudes of and constructive and destructive interference effects among the signals radiated by the individual antennas generally determine the effective radiation pattern of the array. A phased array may be used to point a fixed radiation pattern, or to scan rapidly in azimuth or elevation. Contrary to dish or slotted array antennas, which use physical shape and direction to form and steer the beam, phased array antennas utilize the interference between multiple radiating elements to achieve beam forming and beam steering. By electronically adjusting the signal each element radiates, the combined radiation pattern may be scanned and shaped at high speed and targeted rapidly from one target to another.

This relative amplitude and phase state of the radiation pattern may be produced by controllable attenuators and phase shifters coupled to corresponding antenna elements and/or by beam-forming networks disposed between a plurality of beam ports and the plurality of antenna elements, where each beam port corresponds to one of the beams. Directed-energy unit 302 may radiate any number of targets 304, where the radiation "beams" produced by signal modulation apparatus 200 and may be electronically steered so as to instantaneously radiate and track one or more targets 304.

In a representative embodiment, directed-energy unit 302 may radiate one or more targets 304 with microwave radiation having characteristics of modulated RF signal 216 such that the microwave radiation disrupts an electronic component of the target 304 so that the target 304 discontinues its intended path or track. Microwave radiation, such as modulated RF signal 216, may be modulated to produce a variation in amplitude, frequency, and/or the like, so as to disrupt one or more electronic components on target 304.

Target 304 may include a guidance system and/or a sensor system. Both guidance system and sensor system comprise one or more electronic components, such as processors, memory, circuit boards, sensors, power sources, and/or the like. For example, guidance system may comprise one or more guidance system electronic components, and sensor system may comprise one or more sensor system electronic components. Guidance system may operate to provide thrust, course correction, navigation, and/or the like, to the target 304. Sensor system may operate to track an aircraft, watercraft, and/or the like.

When the target 304 is radiated with modulated RF signal 216 from directed-energy unit 302, the normal function of at least one of guidance system and sensor system may be disrupted so as to disrupt the track of target 304. Disrupting the track of target 304 may include breaking a target lock, causing a course deviation or any other malfunction of target 304.

Modulated RF signal 216 may operate to disrupt an electronic component of target 304 by, for example and without limitation, introducing noise or spurious signals, confusing or overwhelming onboard sensors, creating false electronic signals, and/or the like. By disrupting one or more electronic components of at least one of the guidance system or the sensor system, the modulated RF signal 216 may cause the target 304 to stop tracking or deviate from its course such that the target 304 cannot carry out its intended mission.

Although FIG. 3 depicts a single target 304, anti-missile system 300 is not limited by this embodiment. Anti-missile system 300 may simultaneously track and radiate any number of targets 304 in a defined space. For example, and without limitation, anti-missile system 300 may track and radiate two or more targets 304.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments, however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A method of generating a modulated radio frequency (RF) signal, said method comprising the steps of:
   generating a first continuous wave RF signal having a first frequency;
   generating a second continuous wave RF signal having a second frequency different from the first frequency;
   inputting the first continuous wave RF signal into a right-hand port of a dual-circular polarized antenna;
   inputting the second continuous wave RF signal into a left-hand port of the dual-circular polarized antenna; and
   subsequent to inputting, combining the first continuous wave RF signal and the second continuous wave RF signal to create the modulated RF signal.

2. The method of claim 1, further comprising the step of amplifying at least one of the first continuous wave RF signal and the second continuous wave RF signal prior to inputting into the dual-circular polarized antenna.

3. The method of claim 1, wherein said step of combining occurs substantially in the dual-circular polarized antenna.

4. The method of claim 1, wherein said step of combining occurs substantially subsequent to emission of the first continuous wave RF signal and the second continuous wave RF signal from the dual-circular polarized antenna.

5. The method of claim 1, further comprising the step of radiating the modulated RF signal on a target.

6. The method of claim 5, further comprising the step of the modulated RF signal disrupting at least one of a guidance system electronic component and a sensor system electronic component of the target.

7. The method of claim 1, wherein the modulated RF signal comprises modulated microwave radiation.

8. A signal modulation apparatus, comprising:
   a first signal generator suitably configured to generate a first continuous wave radio frequency (RF) signal having a first frequency;

a second signal generator suitably configured to generate a second continuous wave RF signal having a second frequency different from the first frequency; and a dual-circular polarized antenna suitably configured to receive the first continuous wave RF signal into a right-hand port and to receive the second continuous wave RF signal into a left-hand port, wherein the dual-circular polarized antenna is suitably adapted to induce a combination of the first continuous wave RF signal and the second continuous wave RF signal into a modulated RF signal.

9. The apparatus of claim 8, further comprising at least one amplifier suitably configured to amplify at least one of the first continuous wave RF signal and the second continuous wave RF signal.

10. The apparatus of claim 8, wherein the dual-circular polarized antenna is suitably configured to combine the first continuous wave RF signal and the second continuous wave RF signal into the modulated RF signal substantially in the dual-circular polarized antenna.

11. The apparatus of claim 8, wherein the dual-circular polarized antenna is suitably configured to combine the first continuous wave RF signal and the second continuous wave RF signal into the modulated RF signal substantially subsequent to emission of the first continuous wave RF signal and the second continuous wave RF signal from the dual-circular polarized antenna.

12. The apparatus of claim 8, wherein the dual-circular polarized antenna is suitably configured to radiate the modulated RF signal on a target.

13. The apparatus of claim 12, wherein the modulated RF signal disrupts at least one of a guidance system electronic component and a sensor system electronic component of the target.

14. The apparatus of claim 8, wherein the modulated RF signal comprises modulated microwave radiation.

15. A directed energy unit, comprising:
a first signal generator suitably configured to generate a first continuous wave radio frequency (RF) signal having a first frequency;

a second signal generator suitably configured to generate a second continuous wave RF signal having a second frequency different from the first frequency; and a dual-circular polarized antenna suitably configured to receive the first continuous wave RF signal into a right-hand port and to receive the second continuous wave RF signal into a left-hand port, wherein the dual-circular polarized antenna is suitably configured to induce a combination of the first continuous wave RF signal and the second continuous wave RF signal into a modulated RF signal, and wherein the dual-circular polarized antenna is suitable configured to radiate the modulated RF signal on a target.

16. The directed energy unit of claim 15, further comprising at least one amplifier suitably configured to amplify at least one of the first continuous wave RF signal and the second continuous wave RF signal prior to entering the dual-circular polarized antenna.

17. The directed energy unit of claim 15, wherein the dual-circular polarized antenna is suitably configured to combine the first continuous wave RF signal and the second continuous wave RF signal into the modulated RF signal substantially in the dual-circular polarized antenna.

18. The directed energy unit of claim 15, wherein the dual-circular polarized antenna is suitably configured to combine the first continuous wave RF signal and the second continuous wave RF signal into the modulated RF signal substantially subsequent to emission of the first continuous wave RF signal and the second continuous wave RF signal from the dual-circular polarized antenna.

19. The directed energy unit of claim 15, wherein the modulated RF signal disrupts at least one of a guidance system electronic component and a sensor system electronic component of the target.

20. The directed energy unit of claim 15, wherein the modulated RF signal comprises modulated microwave radiation.

\* \* \* \* \*